Feb. 20, 1945.　　　G. R. DEMPSTER　　　2,369,722
TRANSPORTING AND DUMPING EQUIPMENT
Filed April 26, 1943　　　4 Sheets-Sheet 1

INVENTOR.
George R. Dempster.
BY
Cameron, Kerkam & Sutton.
Attorneys

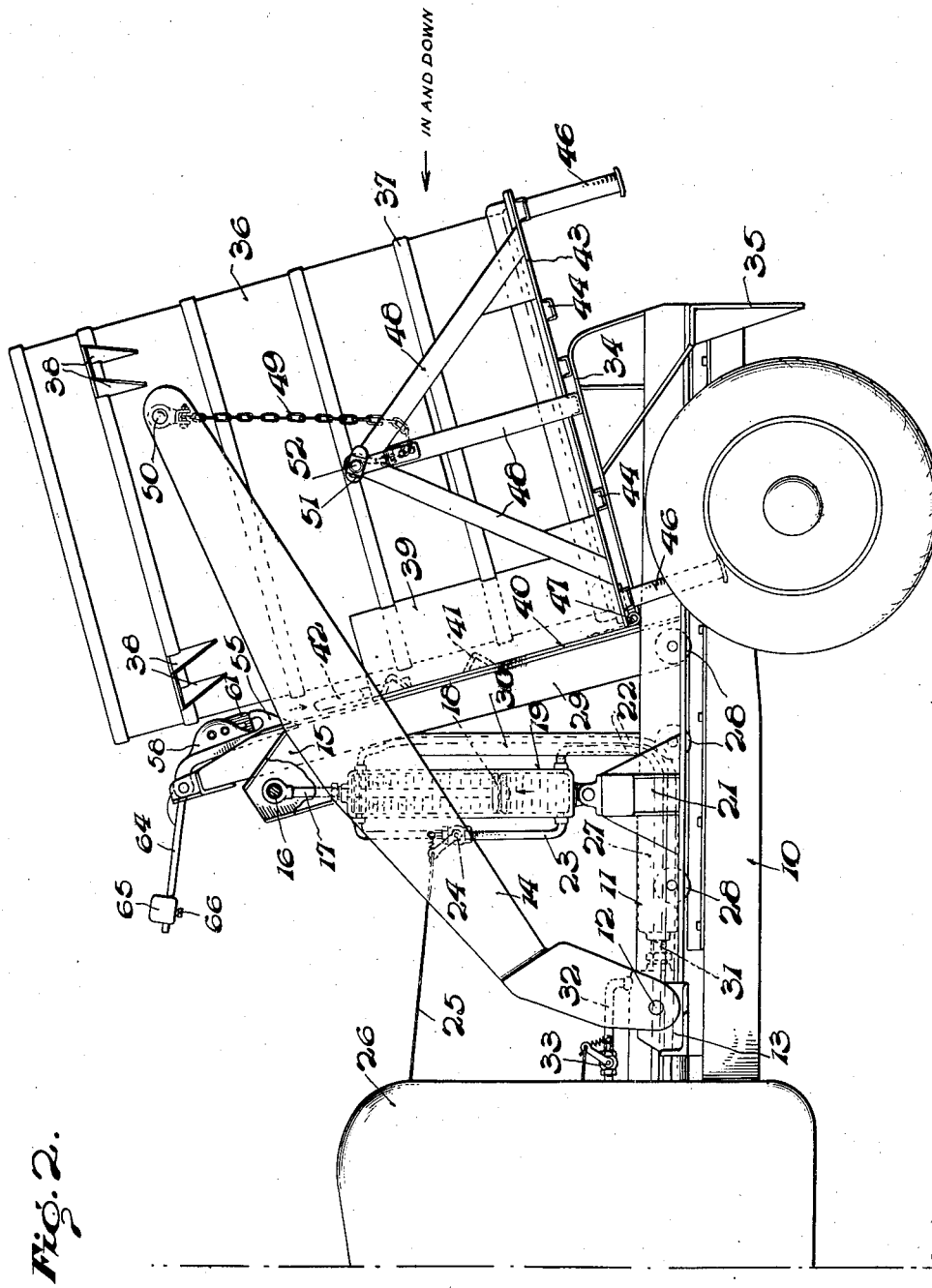

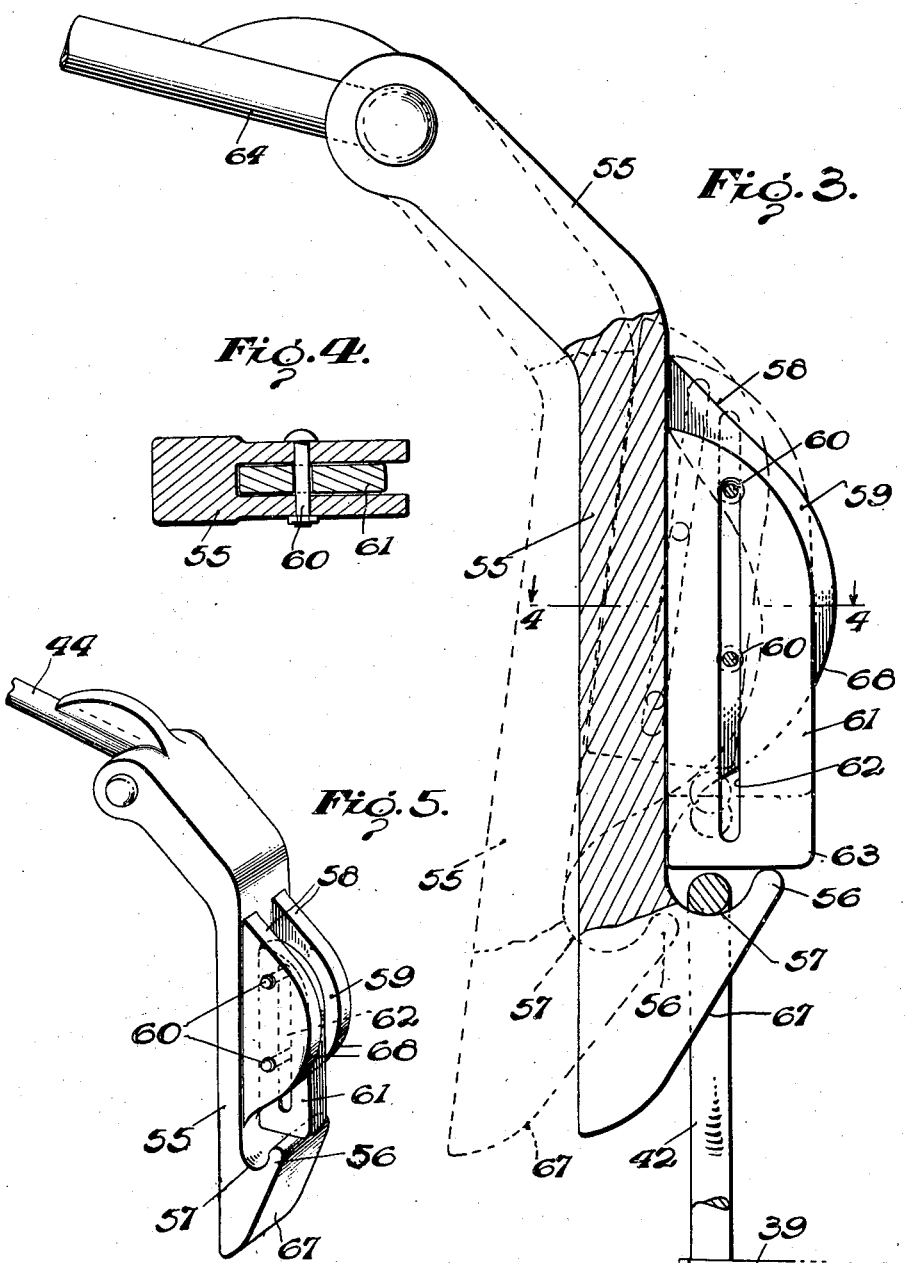

Feb. 20, 1945. G. R. DEMPSTER 2,369,722
TRANSPORTING AND DUMPING EQUIPMENT
Filed April 26, 1943   4 Sheets-Sheet 4
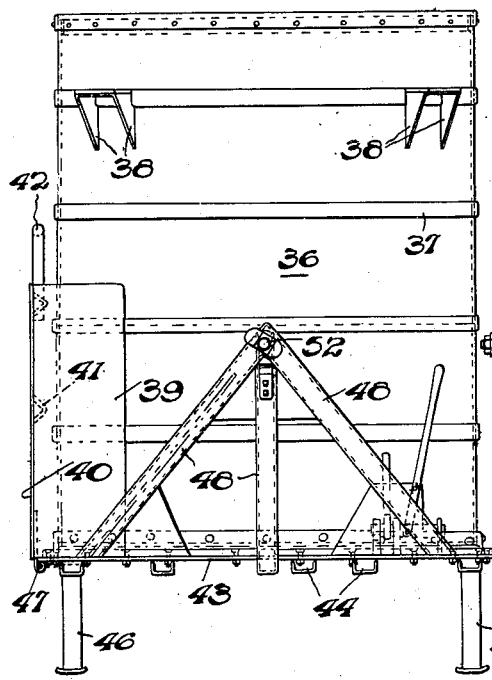
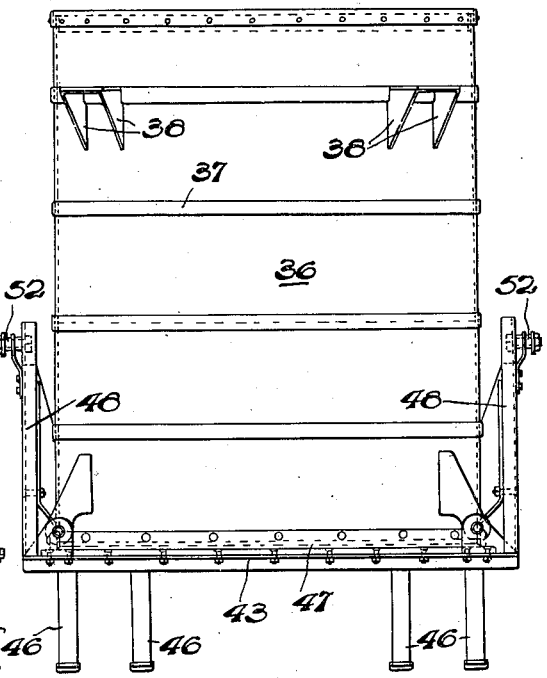
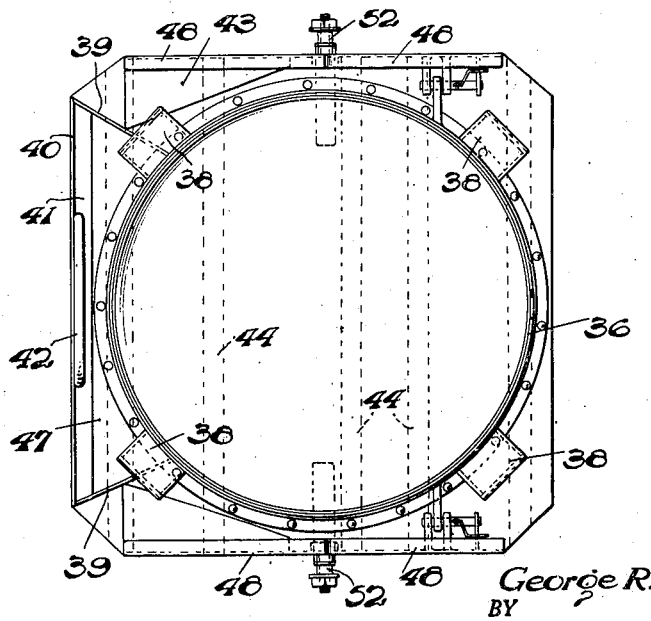
INVENTOR.
George R. Dempster.
BY
Cameron, Kerkam & Sutton
Attorneys Patented Feb. 20, 1945

2,369,722

UNITED STATES PATENT OFFICE 2,369,722

TRANSPORTING AND DUMPING EQUIPMENT

George R. Dempster, Knoxville, Tenn.

Application April 26, 1943, Serial No. 484,636

6 Claims. (Cl. 214—77)

This invention relates to transporting and dumping equipment.

In many metallurgical procedures hot waste material has to be hauled away from the furnaces. It has heretofore been a usual procedure to discharge the waste material from the furnaces into suitable containers which are lifted by cranes onto a trailer or the like, which containers are then moved to a place where they may stand for cooling, and here they are set on the ground to cool. After the waste material has sufficiently cooled the containers are emptied by cranes into dump trucks which carry the waste material to the dump. This necessity for cooling the waste material before it can be put into the bodies of the dump trucks requires the use of a relatively large quantity of equipment in the form of containers, because the cooling period is frequently as long as twenty four hours, and there must be sufficient containers always in service and in various stages of cooling to handle all of the waste from the furnaces.

It is an object of this invention to provide equipment whereby the container which receives the discharge from the furnace may be transported from the furnace directly to the dump, its contents discharged and the container then returned to the furnace for immediate reuse. Thereby the prolonged cooling period for the container is eliminated and the quantity of containers is decreased to a number that little exceeds the number required to receive the discharge from the furnaces at any given time.

Another object of this invention is to provide equipment of the type characterized which is adapted to handle reenforced containers of the general character which experience has shown to be most satisfactory for the purpose of receiving the hot discharge from the furnaces.

Another object of this invention is to provide equipment of the type characterized which is of such height that it may be readily used in plants where the overall vertical clearances are limited.

Another object of this invention is to provide an improved container of generally cylindrical construction which, while possessing particular utility for the service heretofore outlined, constitutes an improved container possessing wide utility for other uses.

Another object of this invention is to provide equipment of the type characterized with an improved automatic hook which, while possessing particular utility for the service hereinbefore outlined, because reducing the overall height of the equipment, is also possessed of wide utility when used with other dumping and transporting equipment and other containers than hereinbefore referred to.

Another object of this invention is to provide an improved transporting and dumping equipment, which, while possessing particular utility for handling hot waste from furnaces, also possesses distinctive advantages enabling its use for other purposes as will be apparent to those skilled in the art.

Other objects of this invention will appear as the description of the invention proceeds.

The invention is capable of receiving a variety of mechanical expressions, one of which is shown somewhat diagrammatically on the accompanying drawings, but it is to be expressly understood that the drawings are for purposes of illustration only, and are not to be construed as definitions of the limits of the invention, reference being had to the appended claims for that purpose.

Referring in detail to the accompaying drawings, wherein the same reference characters are used to designate corresponding parts in the several figures, Fig. 1 is an elevation of a truck provided with equipment embodying the present invention and illustrating the improved container in dumping position;

Fig. 2 is a corresponding view but showing the container in transporting position;

Fig. 3 is an enlarged elevation, partly broken away, of the active end of the improved automatic hook;

Fig. 4 is a cross section on the line 4—4 of Fig. 3;

Fig. 5 is a perspective view, reduced in size, of the active end of the automatic hook; and Figs. 6, 7 and 8 are respectively side, front and plan views of the improved container.

Figure 1:
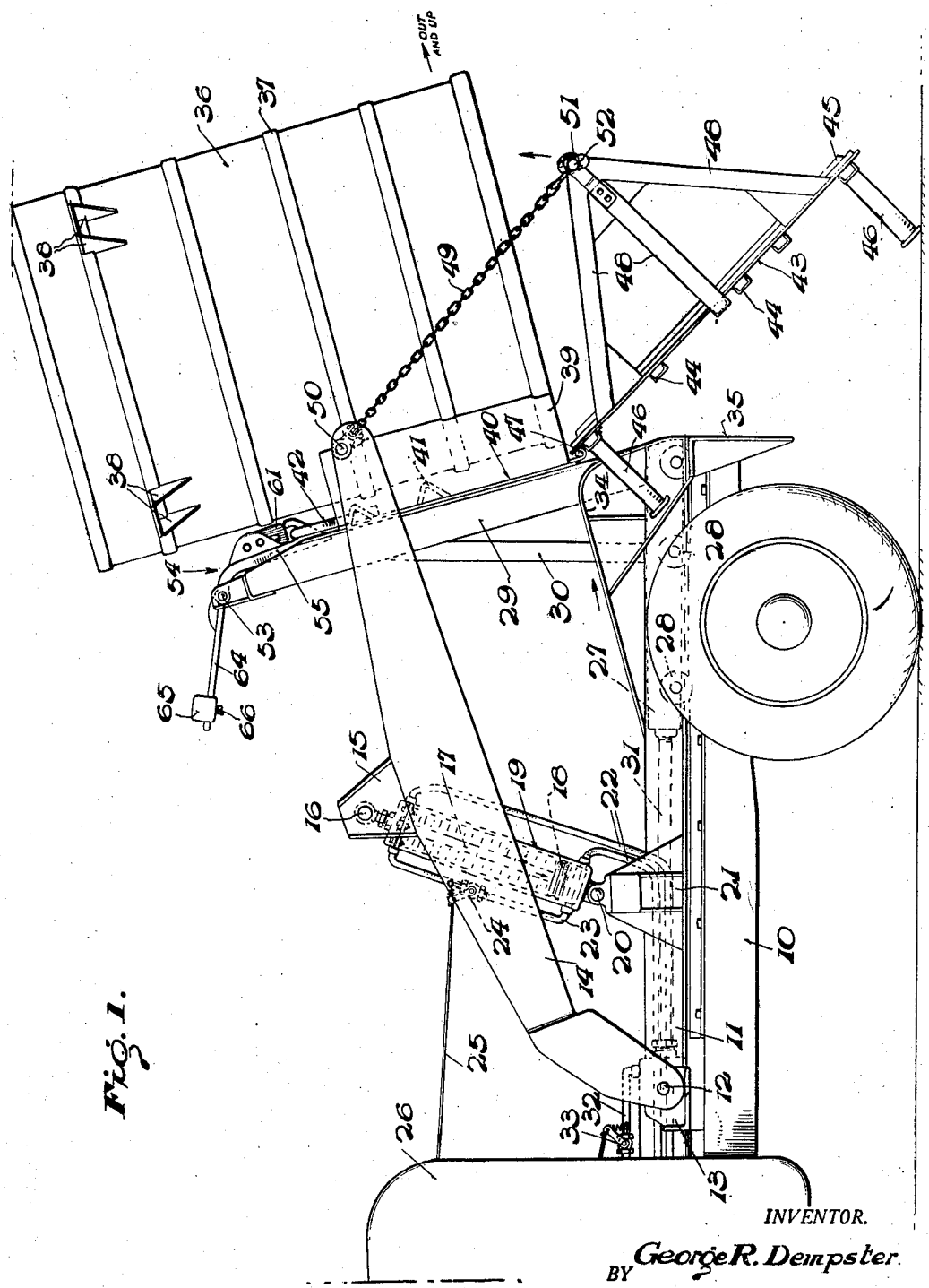

Referring first to Figs. 1 and 2, the embodiment of the invention here illustrated for purposes of exemplification is shown as mounted on a truck 10 of any suitable size and construction, and is preferably formed as a unit having a subframe that may be attached in any suitable way to the chassis of the truck. The subframe includes longitudinally extending angle bars 11, which may take the form of inwardly facing channel bars whose lower flanges constitute tracks or ways for a carriage carrying a skid frame, and suitable transverse members to give adequate rigidity. Pivotally mounted at 12 on a suitable support 13 at each side of the subframe is a boom 14, and said booms are provided with members 15 between which extends a transverse shaft 16. Pivotally connected to shaft 16 is the piston rod 17 of a suitable hydraulic mechanism for moving the booms 13 around their pivots 12, said mechanism including a piston 18 working in a cylinder 19 that in turn is pivotally mounted on a transverse shaft 20 carried by suitable supports 21 rigidly attached to the subframe. The cylinder 19 is provided with suitable piping 22 in communication with a source of hydraulic pressure carried by the truck, and a pipe 23 connects the two ends of the cylinder in which is a suitable control valve 24 that may be manually operated in any suitable way, as by a cable 25 extending to the cab 26 of the truck.

Mounted for movement on the tracks or ways provided by the channel irons 11 is a carriage indicated at 27 and having suitable wheels or rollers 28 at each side thereof to run on said tracks or ways. Extending upwardly from said carriage 27 is a skidway 29 of any suitable construction, here shown as braced to provide adequate strength and rigidity by the struts 30, said skidway being shown as providing a forwardly inclined track up and down which a container may be raised and lowered in sliding contact therewith as hereinafter explained. Associated with said carriage 27 is a second hydraulic mechanism the piston rod of which is indicated at 31 projecting rigidly from a transverse member on the subframe and cooperating with a cylinder on the carriage 27 diagrammatically suggested, said hydraulic mechanism having suitable piping 32 in which is a control valve 33, shown as also controllable from the cab. By operation of the last named hydraulic mechanism the carriage with its skidway may be moved to the rear extremity of the vehicle, as shown in Fig. 1, or advanced to a forward position, as shown in Fig. 2, as to be explained. The longitudinals 11 are also provided with rearwardly and upwardly sloping supporting members 34 of any suitable construction to provide rests for a container in a plane at right angles to the inclined face of the skidway, so that when the carriage 25 is moved forwardly to the position shown in Fig. 2 a container on the skidway may be lowered into contact with and supported by said members 34 as shown in Fig. 2. The rear end of the subframe may also be provided with a depending apron 35 to provide a surface against which a container will bear as it is raised from the ground into cooperative engagement with the skidway. While the foregoing parts have been described as associated into a unit by use of a subframe, it is to be understood that if preferred some or all of the foregoing parts may be suitably attached to the chassis of the truck.

The equipment as so far described is designed to lift a suitable container for hot waste material from its position at the furnace, move it to the transporting position shown in Fig. 2, transport the container to the dump, move the container to the dumping position shown in Fig. 1 whereby its contents are discharged, then return the emptied container directly to the furnace.

While a rectangular or other suitable container may be used in this invention an improved container of generally cylindrical shape as shown at 36, and in greater detail in Figs. 6, 7 and 8, is preferred. Said container is made of any suitable material and constructed in any suitable way to have the requisite strength and resistance to the material to be received and transported thereby. As here shown it is provided with suitable reenforcing bands 37 one of which carries suitable lugs 38 for cooperation with overhead suspending means such as may be used for retaining the container in registry with the discharge outlet of the furnace, or suitable heat dissipating fins may be used. Rigidly secured to its front in any suitable way as by braces 39 is a flat sheet 40 having suitable reenforcement at 41 and providing a support for a U-shaped bail 42 suitably fixed, as by welding, to the inner face of said sheet 40.

Container 36 is provided with a dump-bottom in the form of a generally square rigid plate 43 of any suitable size and material provided with suitable reenforcement at 44 and carrying a circular rib 45 designed to fit snugly into the lower cylindrical end of the container 36. The underside of drop-bottom 43 is provided in any suitable way with legs 46 so that the container may be set on the ground at the desired elevation. Drop-bottom 43 is suitably hinged to the plate 41 at 47, and projecting upwardly from opposite sides thereof, on either side of the container 36 when the drop-bottom is in closed position (see Fig. 2), are generally triangular built-up frames 48 whose apexes are disposed approximately at the midheight of the container when the drop-bottom is closed, so as to give stability when the container is lifted by means cooperating with the apexes of said frames.

Each of the booms 14 has a lifting chain 49 pivotally mounted thereon at 50 and carrying at its free end a suitable hook or link 51 for cooperation with a pin 52 at the apex of a frame 48. The two booms 14 are designed to straddle the container 36 when the container is in transporting position as shown in Fig. 2 and when the container is setting on the ground the booms may be lowered so that the hooks or links 51 on the chains 49 may be readily engaged with the pins 52 in order to lift the container along the skidway 29, whereupon the carriage 27 may be moved forwardly to the transporting position shown in Fig. 2. For dumping, the skidway 29 is moved rearwardly to the position shown in Fig. 1, and in this position the container body is automatically held in its upper position on the skidway so that by lowering the booms 14 the weight of the material in the container will swing the drop-bottom 43 around its hinge 47 and permit discharge thereof. In order to effect the automatic retention of the container in its elevated position shown in Fig. 1, the skidway 29 carries at its upper end a transverse shaft 53 and pivotally mounted on said shaft midway of its length and in a position to cooperate with the bail 42 is an automatic hook generally designated 54 in Figs. 1 and 2.

As shown more particularly in Figs. 3, 4 and 5, said automatic hook includes a rearwardly and downwardly inclined body member 55 having at its rear face an upwardly extending projection 56 so as to provide a curved dwell 57 for cooperation with the bail. The rear face of member 55 carries in spaced relation a pair of lugs 58 whose outer curved periphery constitutes a cam as will be explained. Extending transversely of the slot 59 between said lugs 58 are a pair of pins 60 retained in said lugs in any suitable way. Slidably mounted on said pins 60 is a rectilinearly movable shuttle plate 61 having a longitudinal slot 62 therethrough and through which extend the pins 60. Plate 61 as shown in Fig. 3, has a width such that it overhangs the projection 56.

as shown at 63, so that it may be engaged by the bail 42 in a manner to be described. Body member 55 is also provided with a forwardly extending rod 64 which carries a counterweight 65 (see Figs. 1 and 2) which may be suitably secured on the rod as by a set screw 66. Counterweight 65 is initially adjusted on the rod 64 so that the automatic hook will operate in the manner next to be described.

Assume that the container 36 is setting on the ground at the furnace and filled with waste material to be discharged. The truck is backed up to the container 36 with the skidway 29 at its rearmost position, as shown in Fig. 1, and by operation of the hydraulic mechanism 18, 19, the booms 14 are lowered so that the hooks 51 on the chains 49 may be engaged with the pins 52. The hydraulic mechanism 18, 19, is then operated to swing the booms 14 upwardly, and as the chains are now attached to the frames 48 projecting upwardly from the drop-bottom 43, the container with its waste material is lifted upwardly by its hinged bottom, and by reason of the location of the pins 52 at the apexes of the frames 48 the container is stable when so supported. As the booms 14 swing upwardly the container slides upwardly along the apron 35 and onto the skidway 29, the plate 40 on the container providing a flat surface for cooperation with the face of the skidway. By suitable manipulation of the hydraulic mechanism whose valve is indicated at 33 the carriage 27 may move forwardly on the truck body to the position shown in Fig. 2 preferably under the pressure of the filled container leaning against the skidway and when the carriage reaches the position shown in Fig. 2 the container may be lowered onto the supporting surfaces 34. In this position the booms 14 embrace the container 36 so as to prevent any sidewise displacement of the container. Also, in this position, the legs 46 on the container extend downwardly on either side of the truck body between the side frames and the wheels. With the container in this position, the truck may be driven to the dump.

When the dump is reached, the carriage 27 is moved to its rearward position and the hydraulic mechanism 18, 19 is operated to lift the container 36 into engagement with the automatic hook. As the booms 14 are moved upwardly to lift the container 36, the bail 42 carried by the latter engages the rearwardly and upwardly inclined edge 67 of the body member 55 of the hook and cams the hook from the position shown in full lines in Fig. 3 toward the position shown in dotted lines, this movement being against the action of gravity as controlled by the counterweight 65. When the bail reaches the upper extremity of the inclined surface 67 it engages the lower overhanging edge 63 of the reciprocating shuttle plate 61 and slides the latter upwardly on the pins 60 until the bail has reached an elevation above the projection 56. Thereupon counterweight 65 swings the automatic hook about its pivot 53 causing the projection 56 to enter the bail so that the dwell 57 is beneath the bail.

When the booms 14 are then lowered the bail 42 is engaged with the dwell 57 which stops the downward movement of the body of the container 36, the reciprocating shuttle plate 61 following the bail in its downward movement and locking the bail in the hook against displacement. Continued downward movement of the booms 14 causes the drop-bottom plate 43 to hinge at 47 under the weight of the material in the container 36 until the dump-bottom has swung to the position shown in Fig. 1, discharging the contents of the container. The dump-bottom is then swung upwardly to closing position by upward movement of the booms 14, and when the dump-bottom closes the container 36 the latter is picked up, lifting the bail 42 therewith. Bail 42 slides the shuttle plate 61 upwardly on its pins 60 until the bail reaches the intermediate position diagrammatically indicated in dotted lines in Fig. 3, at which time it is in contact with the curved cam edge 68 of the lugs 58. Continued upward movement of the bail 42 cams the hook to the left as viewed in Fig. 3 until the bail moves out of vertical alignment with the lower edge of the shuttle plate 61, whereupon the latter falls by gravity and closes the entrance to the hook so that upon downward movement of the bail the latter cannot reengage the hook. Thus the bail is automatically disengaged from the hook and the container can be readily lowered to the ground or returned to the supporting members 34.

The container after dumping can again be moved forwardly on the truck to transporting position, as shown in Fig. 2, for return to the furnace, and at the latter location the hydraulic mechanism controlled by the valve 33 is again operated to move the skidway 29 to its rearmost position, displacing the container 36 to a position wherein by lowering the booms 14 the container may be set upon the ground at or adjacent to the furnace and either in position to receive waste material discharged by a chute therefrom or in position for the engagement of supporting means with the lugs 38.

It is to be understood that the container may be provided with any suitable provisions as asbestos packing or other means, to prevent the escape of noxious fumes from the container.

It will therefore be perceived that by the present invention improved dumping equipment has been provided whereby the container for receiving waste material does not have to be cooled off and then dumped into a dump truck, but the container may be taken immediately from the furnace to the dump pile and thereby much saving in equipment effected. While an improved container for the foregoing service has been provided, it will now be apparent to those skilled in the art that the container is of wider utility than this particular service. Similarly, while an improved automatic dump hook has been provided having the advantage of low overall height for the service heretofore described, it will be appreciated by those skilled in the art that the automatic hook is also possessed of much wider utility. Owing to the construction of the booms they not only straddle the container as shown, but they may be lowered into alignment with the subframe on the truck chassis if desired. The automatic hook adds substantially no height to the overall height of the equipment and hence the equipment as hereinbefore described possesses a marked advantage in that it can be used around plants where clearances are low.

While the embodiment of the invention illustrated on the drawings has been described with considerable particularity, it is to be expressly understood that the invention is not restricted thereto as other embodiments of the invention will now be readily suggested to those skilled in the art by the foregoing disclosure, while changes may be made in the details of construction, arrangement and proportion of parts, and particularly any suitable framework, subframe, skidway and carriage, hydraulic mechanism, controls therefor, etc., may be used without departing from the spirit of this invention. While as before pointed out the improved container and the improved automatic hook possess particular utility when used in the combination hereinbefore described they have a much wider utility as will now be apparent, and it is within the contemplation of this invention that each of said container and said hook may be applied to other equipment than that with which it is here shown to be associated. While the equipment has been illustrated as employing the improved cylindrical container of this invention, it will now be apparent that the automatic hook as disclosed will operate in the same way if other forms of containers are used and that within the broader aspects of the invention the equipment may employ suitable containers of generally rectangular form having drop-bottoms. Reference is therefore to be had to the appended claims for a definition of the limits of the invention.

What is claimed is:

1. In a transporting and dumping equipment, in combination with a frame providing a track, a carriage carrying a skidway movable on said track, booms pivotally mounted at the sides of said frame for raising and lowering a container, supporting means carried by the ends of said booms for attaching a container thereto and hydraulic mechanism for controlling the movement of said carriage and said booms, a cylindrical container, a flat plate rigidly secured to the cylindrical wall of said container for cooperation with the skidway, a bottom for said container hinged to said flat plate and including a rectangular plate said rectangular plate projecting laterally from said container, and upwardly extending triangular-shaped members carried by the opposite sides of said rectangular plate exteriorly of said container and provided at their apexes with means for the attachment thereto of said supporting means on said booms, said last named members having their bases substantially coextensive with the opposite sides of said rectangular plate.

2. A cylindrical container for use with transporting and dumping equipment including a cylindrical lateral wall, a flat plate rigidly secured to said cylindrical wall and adapted to provide a flat surface for cooperation with a skidway, a bottom for said cylindrical container hinged to said flat plate, said bottom comprising a plate-like member which is larger than the cross section of said container, said bottom member carrying a circular rib for cooperation with the peripheral wall of said container when the bottom is closed, and means projecting upwardly from opposite sides of said bottom member at the exterior of said container for the attachment of lifting means thereto.

3. A cylindrical container for use with transporting and dumping equipment including a cylindrical lateral wall, a flat plate rigidly secured to said cylindrical wall and adapted to provide a flat surface for cooperation with a skidway, a bottom for said cylindrical container hinged to said flat plate, said bottom including a generally rectangular bottom member whose opposite sides project beyond the cylindrical wall of said container, and generally triangularly shaped members carried by the opposite sides of said rectangular bottom member and having at the apexes thereof means for the attachment of lifting means thereto.

4. In a transporting and dumping equipment, in combination with a frame providing a track, a carriage carrying a skidway movable on said track, booms pivotally mounted at the sides of said frame for raising and lowering a container, supporting means carried by the ends of said booms for attaching a container thereto and hydraulic mechanism for controlling the movement of said carriage and said booms, a cylindrical container, a flat plate rigidly secured to the cylindrical wall of said container for cooperation with the skidway, a bottom for said container hinged to said flat plate, said bottom including a rectangular plate projecting laterally from said container, and upwardly extending triangularly-shaped members carried by the opposite sides of said bottom exteriorly of said container and provided at their apexes with means for the attachment thereto of said supporting means on said booms.

5. A cylindrical container for use with transporting and dumping equipment including a cylindrical lateral wall, a flat plate rigidly secured to said cylindrical wall and adapted to provide a flat surface for cooperation with a skidway, a bottom for said cylindrical container hinged to said plate, said bottom comprising a plate-like member which is larger than the cross section of said container, and means carried by said bottom at the opposite sides thereof exteriorly of said cylindrical wall and projecting upwardly exteriorly of said container at opposite sides thereof to points approximately midway of the height of the container for the attachment of lifting means thereto.

6. In a transporting and dumping equipment, in combination with a frame providing a track, a carriage carrying a skidway movable on said track, booms pivotally mounted at the sides of said frame for raising and lowering a container, supporting means carried by the ends of said booms for attaching a container thereto and hydraulic mechanism for controlling the movement of said carriage and said booms, a cylindrical container having a flat plate rigidly secured to the cylindrical wall thereof and a rectangular bottom hinged to said plate and projecting laterally from the cylindrical wall of said container, and means on said bottom for carrying said container from said bottom, said means being disposed exteriorly of the cylindrical wall of said container at opposite sides thereof and when said bottom is closed projecting upwardly outside of said container approximately to the midheight of said container for the attachment thereto of said supporting means on said booms.

GEORGE R. DEMPSTER.